United States Patent [19]

Bond

[11] Patent Number: 4,703,498
[45] Date of Patent: * Oct. 27, 1987

[54] MESSAGE PLAYBACK CONTROL SYSTEM FOR TELEPHONE ANSWERING MACHINE

[75] Inventor: Raymond G. Bond, Long Beach, Calif.

[73] Assignee: Fortel Corporation, Compton, Calif.

[*] Notice: The portion of the term of this patent subsequent to Dec. 10, 2002 has been disclaimed.

[21] Appl. No.: 842,675

[22] Filed: Mar. 21, 1986

[51] Int. Cl.$^4$ .............................................. H04M 1/65
[52] U.S. Cl. ..................................................... 379/70
[58] Field of Search ........................ 379/70, 74, 77, 76

[56] References Cited

U.S. PATENT DOCUMENTS 4,049,915  9/1977  Danner ................................... 379/76
4,558,179  12/1985  Bond ..................................... 379/70

Primary Examiner—Raymond F. Cardillo
Assistant Examiner—James E. Tomassini
Attorney, Agent, or Firm—Keith D. Beecher

[57] ABSTRACT

A message playback control system for a telephone answering machine of the type in which a user, in order to recover his messages, by operation of a manually operated local switch, causes the message tape in the machine to rewind to a particular position, and then causes the message tape to move in the forward direction and play back the messages recorded on the tape, and then automatically causes the message tape to stop when all the messages have been played back. In the system of the present invention, provision is made so that if the local switch is subsequently operated further control operations may be effectuated.

4 Claims, 2 Drawing Figures

MESSAGE PLAYBACK CONTROL SYSTEM FOR TELEPHONE ANSWERING MACHINE

BACKGROUND OF THE INVENTION

In the prior art machines, the user has no way of knowing when the current messages have ended during an operation in which he causes the message tape to rewind, and then to move in the forward direction, so that he can retrieve the messages recorded on the message tape. This is because, when the message tape is set to playback, it will continue to reproduce all current messages, and will continue to move in the forward direction after the current messages have all been reproduced. This continued forward movement of the message tape often results in previously unerased messages being reproduced. This tends to cause confusion to the user, since it is often difficult to distinguish between current and previous messages.

The problem described in the preceding paragraph is solved by the control system of U.S. Pat. No. 4,558,179, which is assigned to the present Assignee. In the system disclosed in that patent, the message tape is rewound by the operation of a local switch, which, when operated, causes the message tape to rewind, and then to move forward and play back all the recorded messages, and which automatically causes the forward motion of the message tape to stop after the user has retrieved all current messages recorded on the message tape. In the system described in the patent, the single operation of the local switch causes the machine to perform all the foregoing operations, and also causes the machine, after the operations have been completed, to return to its automatic answer condition ready for the next call.

The foregoing is achieved in the machine described in the patent by a microcomputer which senses the displacement of the message tape when a rewind operation is initiated by operation of the manual switch, and which then automatically causes the message tape to stop at the end of the ensuing playback operation when the tape again reaches the point at which rewind was initiated.

The control system described in the patent returns the machine to its automatic answering condition after the message tape has been automatically stopped at the end of the playback operation. The control system described in the patent then returns the machine to its automatic answering condition after the message tape has been automatically stopped.

Should the user wish to retain the messages on the message tape in the system described in the patent, no further operation on his part is necessary.

In the system of the present invention, if the user does not wish to retain the messages on the message tape, he causes the message tape to rewind to a selected origin position, by again operating the manual switch. Other control operations are also possible in the system of the present invention by subsequent operations of the manual switch, as will be described.

DETAILED DESCRIPTION OF THE ILLUSTRATED EMBODIMENT

Figure 1:
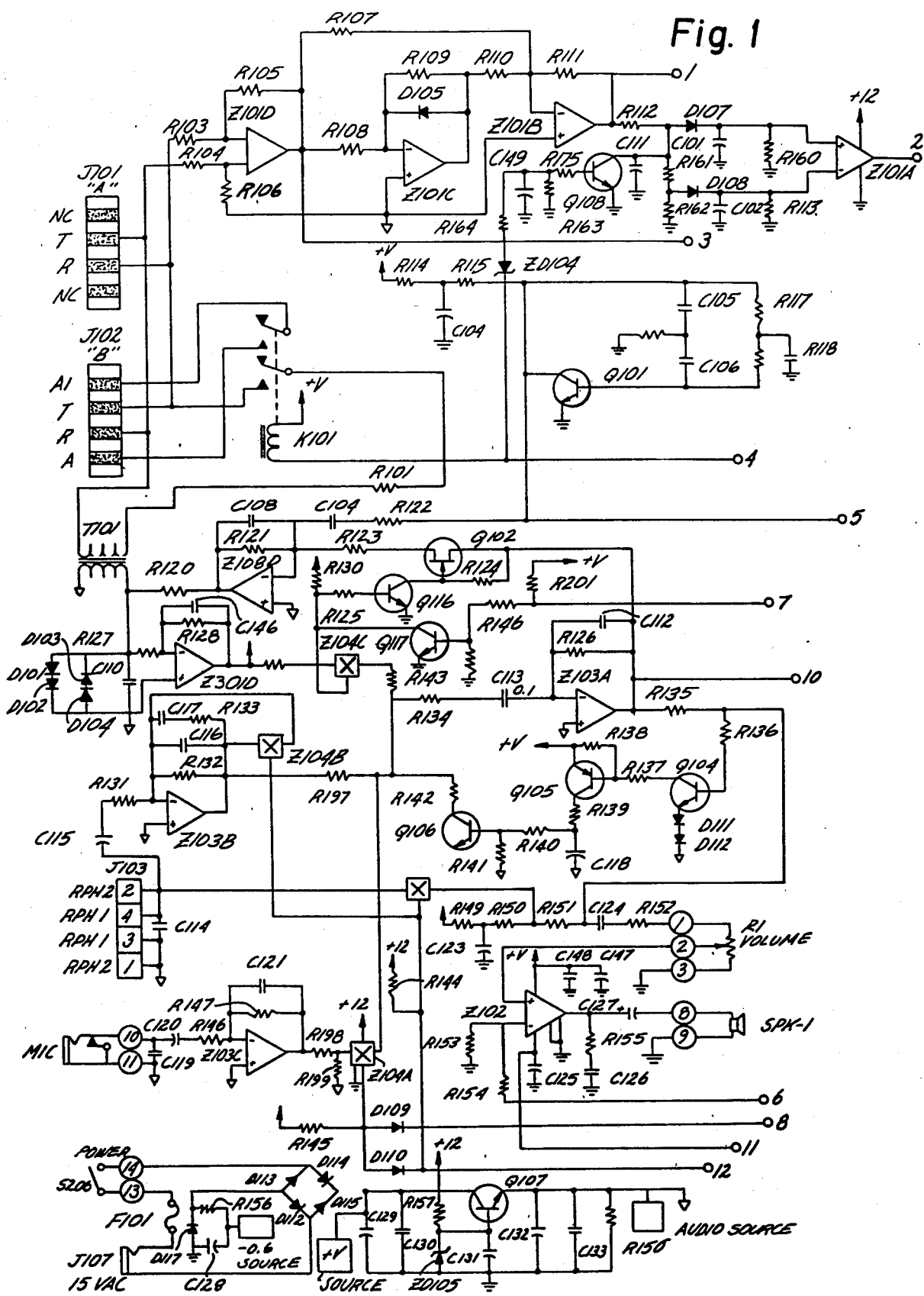
FIGS. 1 and 2 are representations of a schematic circuit diagram of a telephone answering machine incorporating the remote control system of the present invention.
Figure 2:
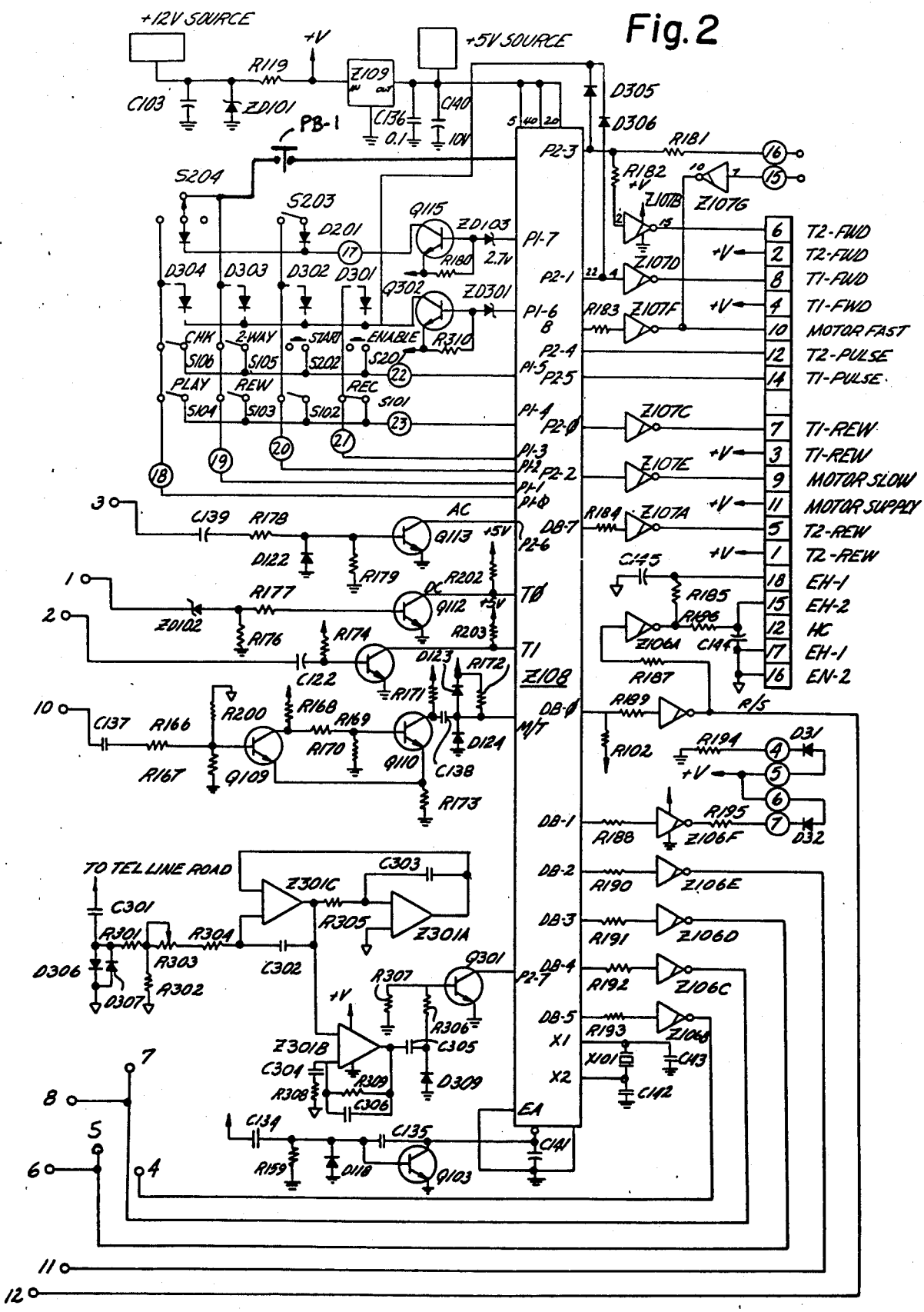

The system shown in FIGS. 1 and 2 includes a microcomputer Z108 which may be of the type manufactured and sold by National Semiconductor Company, and which is designated by them as INS8048. The system also includes a connector J102 which has terminals 3 and 4 connected to the tip and ring terminals of the telephone line. Line seizure is effectuated by a relay K101. The system is coupled to the telephone line through a transformer T101. The outgoing audio signals corresponding to the announcement transmitted by the system during the announcement interval ($T_1$) is amplified by an amplifier Z103D. The incoming audio signals to be recorded during the message interval ($T_2$) are amplified by an amplifier Z103A. A conector J103 is connected to the record and reproduce head RPH2 associated wih the T-2 message tape, and to the record and reproduce head RPH1 associated with the T-1 announcement tape.

The incoming audio signals representing the message to be recorded are passed through transformer T101 and through a bilateral analog switch Z104C to amplifier Z103A, and through a bilateral analog switch Z104D to the record/reproduce head RPH 2 to be recorded on the message tape T-2. Resistors R149, R150 and R151, together with grounded capacitor C123 provide a bias circuit for the head. An automatic gain control circuit for amplifier Z103A is provided by transistors Q104, Q105, Q106. The announcement recorded on the announcement tape T-1 is amplified by amplifier Z103B, and through amplifier Z103A and amplifier Z103D to transformer T101 for application to the telephone line.

The ring signal for the telephone answering system is initiated when a ring signal occurs at the tip (T) and ring (R) terminals of connector J102. The ring signal is fed to an operational amplifier Z101D. The alternating current signal output of amplifier Z101D is fed to port P26 of microcomputer Z108, by way of a differentiator circuit formed by capacitor C139, resistor R178, diode D122, resistor R179 and transistor Q113.

The microcomputer Z108 decides whether or not the alternating current output of amplifier Z101D is of proper duration (400 milliseconds) and frequency (16–68 Hz), and if so activates the T-1 announcement tape when the ring signal count matches the count set by the ring select switch S203. Ring select switch S203 can be set to cause the system to respond to a selected number of rings before activation, according to the setting of the switch. However, if during a previous $T_2$ message record mode T2 pulses are not received at port P2-4 of the microcomputer, this is an indication that the T-2 message tape has broken or is full. If that occurs, the microcomputer ignores the setting or ring select switch for all future calls and cause the machine to answer only after a large number of rings (i.e. 10) are received.

When the microcomputer Z108 recognizes the present ring count, or the larger ring count, it initiates a T-1 cycle. The T-1 cycle activates the T-1 announcement tape, causes the system to go off hook, and plays the announcement recorded on the announcement tape over the telephone line. For this purpose, microcomputer Z108 activates port P2-2 which turns on a motor (M1) at its regulated speed (motor slow) by way of driver Z107E, and terminal J105-9. Port P2-2 of the microcomputer is turned on at this time to activate the T-1 forward solenoid. This action in conjunction with the activation of motor M1 pulls in the T-1 head plate and starts the T-1 tape moving. At the same time, port DB-5 of the microcomputer Z108 goes high (1), and its output is fed to an inverting amplifier driver Z106B, whose output $\overline{LS}$ is at ground potential. This activates relay K101 which puts transformer T101 and resistor R101 across the tip and ring terminals of strip J102, providing a line seize (off-hook) condition. Port DB-4 of the microcomputer is low (0) at this time, and its output is inverted by inverter Z106C providing high (1) potential at its output (T/$\overline{R}$). This potential is fed to the base of transistor Q117 to render the transistor conductive. When transistor Q117 is conductive, it causes the bistable analog switch Z104C to be biased off by way of resistor R130.

Audio signals corresponding to the audio announcement recorded on the moving T-1 tape are picked up by record head RP-1 and fed by way of capacitor C115 and resistor R113 to amplifier Z103B. The audio signals are amplified by a gain of approximately 200, and fed to amplifier Z103A by way of resistors R1987 and R134, and capacitor C113. The audio signals are amplified in amplifier Z103A by a gain of approximately 100, and is fed to field effect transistor (FET) Q102 which is biased to its conductive state by resistor R124. So long as transistor Q116 is non-conductive, the announcement audio signals are passed through FET Q102 to amplifier Z103D, from which they are fed to the line transformer T101. The line transformer transmits the outgoing audio announcement signals to the telephone line.

The audio output from Z103A is also fed to a Schmitt trigger formed of transistors Q109 and Q110 by way of capacitor C137 and resistor R166. The square audio signal from the collector of Q10 is fed to a differentiator circuit formed by capacitor C138 and resistor R172. The resulting negative-going spikes are interrogated by microcomputer Z108 by way of port $\overline{INT}$ to detect a beep tone (1530 Hz–2070 Hz) which is recorded on the T-1 announcement tape, and which signals the end of the T-1 announcement. When the beep tone recorded on the T-1 tape is recognized, the microcomputer turns off port P2-1 which releases the T-1 forward solenoid. This action causes the head plate to retract, and stops the T-1 tape.

The message recording cycle (T$_2$) begins when the beep tone on the announcement tape (T-1) is recognized by the microcomputer Z108. When the message recording cycle (T$_2$) begins, the message tape T-2 is activated to permit the recording of the message received from the calling party over the telephone line for the length of the time specified by the setting of the message time switch S204. In the "none" position the message recording cycle (T$_2$) shuts off immediately. When the switch S204 is in the "fix" position, the message received over the telephone line may be recorded for a fixed interval of time, after which the machine will automatically shut off. When the switch S204 is in the "VOX" position, the message received over the telphone line will continue to be recorded on the message tape T-2 for so long as the calling party continues to talk, up to the capabilities of the message tape. Specifically, the machine will continue to record the message until there is a 7 second break in the audio signal, or a dial tone is encountered, or a busy is encountered, or a pulse due to the calling party hanging up occurs.

The VOX interrogation of the incoming audio signal is controlled by the microcomputer Z108. The external circuitry necessary for this function is a Schmitt trigger formed by transistosrs Q109 and Q110 which digitizes the audio information. Once the microcomputer has determined that no audio is present, or that a spurious audio signal is present, the microcomputer will output a beep tone to the tape heads and to the telephone line by actuating a beep oscillator circuit associated with transistosr Q101. The T-2 message tape will now rewind an amount coerresponding to the 7 second time-out, and the T-2 tape will then be disengaged. The system will then transfer the T-1 announcement tape, and rewind the T-1 announcement tape to its origin position, and await the next call.

When the beep tone recorded on the T-1 announcement tape is recognized by the microcomputer Z108, it sets the port P2-1 low (0) which disengages the T-1 forward solenoid. The motor (M1) remains on by way of port P2-2. Port P2-3 is then made high (1), and its output, after inversion by inverter Z107B energizes the T-2 play solenoid. This action, in conjunction with the activation of motor M1 engages the T-2 head plate causing the T-2 message tape to move in the forward drection. The system now enters its T$_2$ cycle, during which port DB-5 remains high (1) maintaining line seizure.

The audio signals from the telephone line are fed into the system when the microcomputer Z108 causes port DB-4 to go high (1), the output being inverted by inverter Z106C causing its output T/$\overline{R}$ to go low (0). When T/$\overline{R}$ goes low, Q117 becomes non-conductive to allow voltage from resistor R130 to turn on analog switch Z104C. When switch Z104C is turned on, it permits the audio signal from the telephone line to be passed to amplifier Z103A by way of transformer T101, R127, R129, Z104C, Z143, R134 and C13. Amplifier Z103 feeds audio signals to the heads RPH2 of the T-2 message tape by way of resistors R135 and R151, analog switch Z104D and connector J103-2. Resistors R149 and R150, and capacitor C123 provide a 6 volt DC bias to transistor Q106. Analog switch Z104D is turned on at this time by the microcomputer Z108 causing port DB-0 to go low (0), and output R/$\overline{P}$ to go high (1), so that audio may be applied to the T-2 heads RPH2. The amplifier Z103B is disabled at this time, because analog switch Z104B is also turned on.

At the end of the T$_2$ message recording interval, port P2-3 goes low releasing the T-2 head tape. Port P2-0 will then go high (1) activating the announcement T-1 rewind solenoid. This causes the announcement tape T-1 to rewind to its origin position. When that position is reached, no more T1 pulses are received at port P2-5 and the microcomputer terminates the rewind operation and sets the system in condition to receive the next call.

In this manner, successive messages are recorded on the message tape T-2. In order to retrieve his messages, the user momentarily depresses pushbutton switch PB-1. This causes port DB-7 of microcomputer Z108 to go high (1) causing the T-2 rewind solenoid to be energized to activate the rewind mechanism and rewind the T-2 tape back, either to its beginning position or to some other origin position which is stored in the microcomputer.

When the T-2 tape reaches the selected origin position, port DB-7 goes low (0) de-energizing the T-2 rewind solenoid to stop the T-2 tape. Port P2-3 now goes high (1) activating the T-2 forward solenoid to cause the T-2 tape to move in its forward direction.

Audio information is now fed from the T-2 record-/reproduce head (RPH2) through J103 to pre-amplifier Z103B, and then to amplifier Z103A by way of resistor R197, resistor R134 and capacitor C113. Amplifier Z103A feeds the audio information from the T-2 message tape and through amplifier Z102 to speaker SPK-1. The messages recorded on the message tape T-2 are then reproduced by the speaker at a volume established by the setting of potentiometer R1.

After all the messages recorded on the T-2 tape have been reproduced by the speaker, the microcomputer Z108 senses the fact that the message tape has returned to the point at which rewind was initiated and stops the T-2 message tape. This control is achieved by feeding pulses into port P2-4 from a T-2 pulse switch whenever the message tape T-2 is moving. The microcomputer counts these pulses and stores them in memory. When the pulses fed from J105-13 into port P2-4 match the number that is set in memory, the programming of the microcomputer determines that this signifies the end of the messages recorded on the T-2 message tape, and will cause the T-2 tape to stop.

The microcomputer stops the T-2 message tape by causing the P2-3 port to go low (0) so as to de-activate the T-2 forward solenoid. The microcomputer will then rewind the T-1 announcement tape by causing port P2-0 to go high (1) which turns on the T-1 rewind solenoid. The T-1 solenoid rewinds the T-1 tape until T-1 pulses at port P2-5 stop signifying that the beginning of the T-1 announcement tape has been reached. When the T-1 announcement tape reaches its beginning, the machine is again ready to answer any subsequent calls received over the telephone line.

Now, should the pushbutton switch PB-1 be actuated momentarily within a predetermined time after the T-2 message tape has been returned to the position it occupied prior to the initial actuation of the PB-1 switch, the message tape will then be rewound to its origin position, and all messages presently on the T-2 message tape will be erased. When the message tape returns to its original origin position, it stops, and the machine is now set to its automatic answer mode in condition to receive and record new incoming messages.

Should the user actuate the pushbutton switch PB-1 while messages are being played back, the T-2 tape will rewind for as long as the pushbutton switch PB-1 is depressed. Then, when the switch PB-1 is released, the message tape will return to its forward direction playing back messages recorded thereon. This operation provides a backspace control for the message tape, so that any number of messages may be repeated during the playback operation.

Should the user press the pushbutton switch PB-1 for a predetermined period of time, after the message tape T-2 hs been returned to its origin position, and before the playback of the messages on the tape has commenced, the message tape will move at fast forward speed back to the position it occupied at the end of all previously recorded incoming messages, and the machine will be set to its automatic answer mode in preparation for recording additional incoming messages.

In another mode of operation, the pushbutton switch is operated to cause the message tape to return to its origin position and then play back all previously recorded messages as it is returned to its original position, and in which the message tape then returns automatically to the origin position and to its automatic answer mode, without any need to press the pushbutton again.

It will be appreciated that while particular embodiments of the invention have been shown and described, modifications may be made. It is intended in the claims to cover all modifications which come within the true spirit and scope of the invention.

We claim:

1. In a telephone answering machine which responds to telephone messages received over a telephone line when in an automatic answer mode, and which includes a mechanism for recording messages received over the telephone line on a magnetic tape, the combination of: a micro-computer; manually operated local swtich means connected to the micro-computer; circuit means connecting the micro-computer to the magnetic tape mechanism to cause the magnetic tape mechanism to rewind the magnetic tape in a reverse direction to a predetermined origin position when said local switch means is manually operated; further circuit means connecting the micro-computer to the magnetic tape mechanism to cause the magnetic tape mechanism automatically to move the magnetic tape in the forward direction after it has reached said predetermined origin position; control circuitry connected to the micro-computer for enabling the micro-computer to stop the forward motion of the magnetic tape mechanism after it has returned to the position at which said local switch means was manually operated and to set the telephone answering machine to said automatic answer mode; a sound transducer; circuit means connecting the magnetic tape mechanism to the sound transducer to cause the sound transducer to reproduce the messages recorded on the magnetic tape during the forward motion thereof; and further control circuitry connected to the micro-computer and to the magnetic tape mechanism to cause the magnetic tape to rewind for as long as said local switch means is actuated when said local switch means is actuated during the period when messages on the magnetic tape are being reproduced during the forward motion of the magnetic tape.

2. The combination defined in claim 1, in which said manually operated local switch means causes the magnetic tape to return to said predetermined origin position and then move in its forward direction to reproduce the messages previously recorded thereon, and in which said further control circuitry causes the magnetic tape to return automatically to said predetermined origin position after it has reached the position it was in when said local switch means was first manually operated.

3. In a telephone answering machine which responds to a telephone messages received over a telephone line when in an automatic answer mode, and which includes a mechanism for recording messages received over the telphone line on a magnetic tape, the combination of: a micro-computer; manually operated local switch means connected to the microcomputer; circuit means connecting the micro-computer to the magnetic tape mechanism to cause the magnetic tape mechanism to rewind the magnetic tape in a reverse direction to a predetermined origin position when said local switch means is manually operated; further circuit means connecting the micro-computer to the magnetic tape mechanism to cause the magnetic tape mechanism automatically to move the magnet tape in the forward direction after it has reached said predetermined origin position; control circuitry connected to the micro-computer for enabling the micro-computer to stop the forward motion of the magnetic tape mechanism after it has returned to the position at which said local switch means was manually operated and to set the telephone answering machine to said automatic answer mode; a sound transducer; circuit means connecting the magnetic tape mechansim to the sound transducer to cause the sound transducer to reproduce the messages recorded on the magnetic tape during the forward motion thereof; and further control circuitry connected to the micro-computer and to the magnetic tape mechanism for causing the magnetic tape to move forward at a fast speed when said local switch means is manually operated for a predetermined period of time after the magnetic tape has returned to said predetermined origin position and before the messages recorded on the magnetic tape have been reduced, the magnetic tape moving forward at fast speed to the position it was in when said local switch means was first manually operated.

4. The combination defined in claim 3, in which said further control circuitry causes the magnetic tape to stop its fast forward motion automatically upon reaching the position it was in before said local switch means was manually operated and returning the telephone answering machine to the automatic answer mode.

* * * * *